(12) United States Patent
Chang et al.

(10) Patent No.: US 7,861,033 B2
(45) Date of Patent: Dec. 28, 2010

(54) SYSTEM ARCHITECTURE FOR IMPLEMENTING VIRTUAL DISK SERVICE EQUIPMENT

(75) Inventors: Hai-Yan Chang, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 515 days.

(21) Appl. No.: 12/049,925

(22) Filed: Mar. 17, 2008

(65) Prior Publication Data

US 2009/0235256 A1    Sep. 17, 2009

(51) Int. Cl.
  G06F 12/00    (2006.01)
  G06F 13/00    (2006.01)
  G06F 13/28    (2006.01)

(52) U.S. Cl. .................................. 711/112; 711/170

(58) Field of Classification Search ................ 711/112, 711/170
See application file for complete search history.

(56) References Cited

U.S. PATENT DOCUMENTS

2005/0240727 A1* 10/2005 Shah et al. .................. 711/114
2007/0079060 A1*  4/2007 Burkey et al. ............... 711/112
2009/0063767 A1*  3/2009 Graves et al. ............... 711/114

OTHER PUBLICATIONS

Microsoft. What is Virtual Disk Service. Mar. 28, 2003. Avilable at: http://technet.microsoft.com/en-us/library/cc778187(WS.10).aspx.*
Microsoft. About VDS. Sep. 30, 2010. Available at: http://msdn.microsoft.com/en-us/library/aa381442(v=VS.85).aspx.*

* cited by examiner

*Primary Examiner*—Kevin Ellis
*Assistant Examiner*—Ryan Bertram
(74) *Attorney, Agent, or Firm*—Workman Nydegger

(57) ABSTRACT

A system architecture for implementing a virtual disk service (VDS) equipment is applicable for implementing an overall management on multiple service request objects in a VDS system. The system architecture includes a VDS interface, a subsystem management module, an object management module, a virtual disk management module, and a specific management module. The VDS interface receives a service request, and renders the service request to the subsystem management module for judging a type of the service request. The virtual disk management module generates a plurality of virtual interfaces for being invoked by the subsystem management module, so as to execute the service request of a public operation type. When the service request requires for supporting an asynchronous processing, the specific management module is further invoked to process the service request, and generates a feedback result to respond the service request via the VDS interface.

6 Claims, 5 Drawing Sheets

US 7,861,033 B2

SYSTEM ARCHITECTURE FOR IMPLEMENTING VIRTUAL DISK SERVICE EQUIPMENT

BACKGROUND OF THE INVENTION

1. Field of Invention

The present invention relates to a virtual disk service (VDS) system architecture, and more particularly to a system architecture for implementing a VDS equipment applicable for performing an overall management on multiple service request objects.

2. Related Art

Simple storage area network (simple SAN) is a storage system management protocol standard promoted by Microsoft. In order to support Simple SAN, Hwprovider of virtual disk service (VDS) system can not be realized without obeying to the standard set forth according to the simple SAN. The so-called HwProvider needs to manage multiple types of equipment objects, such as a port, a target, a logic unit number (LUN), and a service controller. The management on the equipment objects includes addition of the equipment objects, deletion of the equipment objects, addition of alias for the equipment objects, modification of alias for the equipment objects, and relationship distribution operation on two equipment objects requiring for a relationship (such as Portal and Portal Group need to be related, Port and Controller need to be related, and Group and Target need to be related). Some application programs of the VDS system further support a specific management mechanism such as asynchronous operation management or event notification for the equipment objects.

FIG. 1 is a schematic view of a conventional system architecture for implementing a VDS equipment. Referring to FIG. 1, the system architecture for implementing a VDS equipment includes a VDS interface 120 for receiving service requests of a plurality of application programs (110, 112, and 114). A subsystem management module 130 defines operations of all the equipments, and the equipments each have a unique interface for processing the operation corresponding to the service request. After a logical process on the service request, the subsystem management module 130 transmits the service request to a corresponding object management module for being processed (for example, a first type equipment object management module 142, a second type equipment object management module 144, and a Nth type equipment object management module 146). If the service request requires for an operation of supporting asynchronous or other specific request such as event execution notification, the service request is rendered to a specific management module (such as a first type equipment specific management module 152, a second type equipment specific management module 154, and a Nth type equipment specific management module 156) for processing. When implementing the VDS system, all the possible operation requests in the VDS system are all implemented according to different equipment types. However, many operations in the VDS system have similar characteristics, for example, modification of target alias, modification of LUN alias, or modification of subsystem alias. It is a waste of time for implementation to have all the operations implemented in the subsystem management module. Moreover, if it intends to add a new equipment, a specific management module should be added correspondingly to the new equipment, such that the new equipment can support the asynchronous management requirement. It is obviously a waste of labor, time, and cost in system maintenance to practically implement the corresponding specific management module for the new equipment.

SUMMARY OF THE INVENTION

In view of the above problems of being difficult to implement the system architecture of the VDS equipment, and failing to perform an overall management on multiple objects on the VDS, the present invention is directed to a system architecture for implementing a VDS equipment. The operations having the same feature of each request object are abstracted and operated as a public operation so as to form a virtual disk management module, and the virtual disk management module is used to perform an overall management on the multiple request objects.

As embodied and broadly described herein, the system architecture for implementing a VDS equipment in the present invention includes a VDS interface for receiving a service request of at least one application program; a subsystem management module for executing a logical process according to the service request transmitted by the VDS interface, so as to determine whether a type of the service request is a public operation or a non-public operation; a plurality of object management modules invoked by the subsystem management module, so as to execute the service request of the non-public operation type; a virtual disk management module for generating a plurality of virtual interfaces for being invoked by the subsystem management module according to a plurality of functions provided by the plurality of object management modules, so as to execute the service request of the public operation type; and a specific management module invoked by the virtual disk management module. The specific management module includes an asynchronous management module invoked to execute the service request when the service request is public operation type and requires for an operation of supporting asynchronous management; and an event notification module for generating a feedback result and responding the received service request via the VDS interface.

In the system architecture for implementing a VDS equipment according to a preferred embodiment of the present invention, the public operation is title management, operation of deleting equipment object, or operation of supporting asynchronous management. Furthermore, the subsystem management module further records all the object management modules and relationship between the object management modules.

In the system architecture for implementing a VDS equipment according to a preferred embodiment of the present invention, when the subsystem management module determines that the service request is a non-public operation type, the subsystem management module directly invokes the object management module corresponding to the service request, and transmits the service request to the object management module for being executed.

In the system architecture for implementing a VDS equipment according to a preferred embodiment of the present invention, the operation of supporting asynchronous management includes establishment of LUN, deletion of LUN, expansion of LUN, reduction of LUN, recovery of LUN, establishment and deletion of target, establishment and deletion of port, or addition and removal of port.

In the system architecture for implementing a VDS equipment according to a preferred embodiment of the present invention, the asynchronous management module synchronously processes a plurality of asynchronous operation instructions transmitted by the virtual disk management module through enabling multiple threads.

Based on the above, the system architecture for implementing a VDS equipment supply in the present invention takes the common operation objects of the equipments as public operations, implements the virtual disk management module to execute the public operations and automatically invoke the corresponding object management module, and further implements the specific management module to process the asynchronous operation instructions (programs) in the public operations. When the equipment object is replaced, the asynchronous operation can be realized without realizing the corresponding specific management module, such that the maintenance cost of the VDS equipment is reduced, and an overall management on the various equipment objects in the system is achieved.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The objectives and implementing methods of the present invention are illustrated in the following preferred embodiments in detail. However, the concept of the present invention may also be used in other scope. The following embodiments are merely used for illustrating the objectives and implementing method of the present invention instead of limiting the scope.

Figure 1:
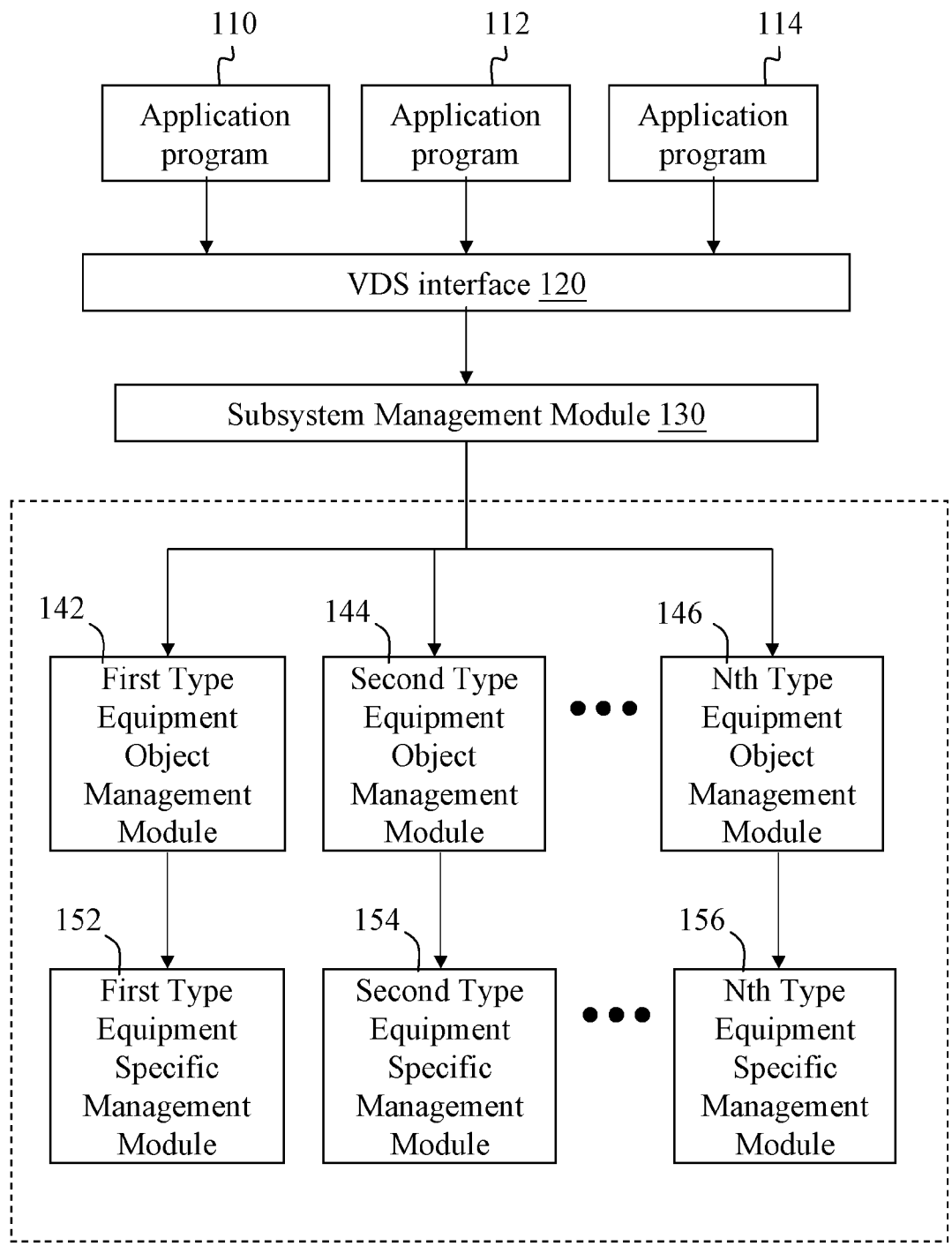
FIG. 1 is a schematic view of a conventional system architecture for implementing a VDS equipment.
Figure 2:
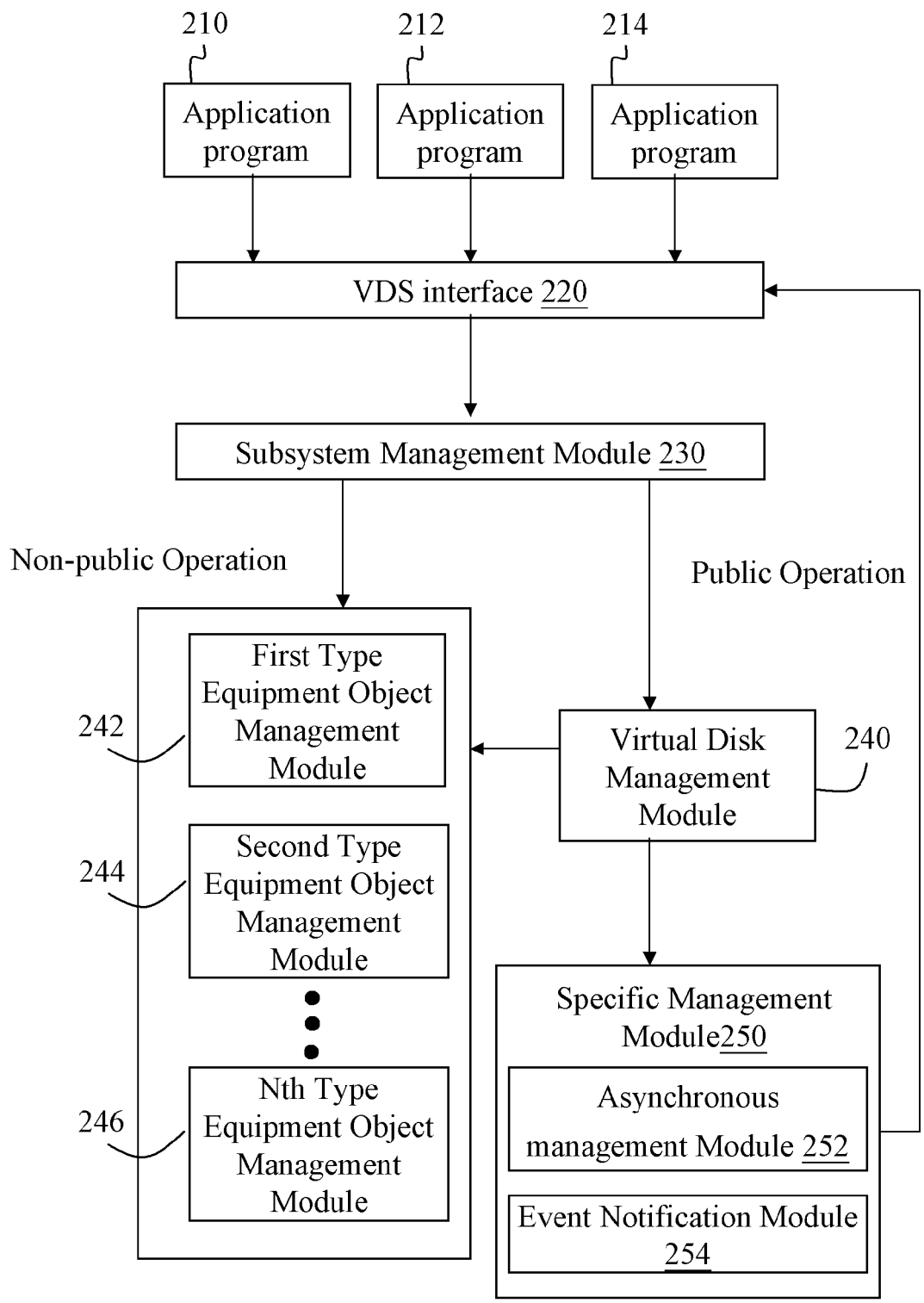
FIG. 2 is a schematic view of a system architecture for implementing a VDS equipment according to the present invention.

FIG. 2 is a schematic view of a system architecture for implementing a VDS equipment according to the present invention. Referring to FIG. 2, in this embodiment, the system architecture for implementing a VDS equipment includes a VDS interface 220, a subsystem management module 230, a plurality of object management modules (such as a first type equipment object management module 242, a second type equipment object management module 244, and a Nth type equipment object management module 246), a virtual disk management module 240, and a specific management module 250. The specific management module 250 further includes an asynchronous management module 252 and an event notification module 254.

The VDS interface 220 provides a plurality of interfaces for receiving a service request of at least one application program (210, 212, and 214). The subsystem management module 230 receives the service request transmitted by the VDS interface 220 (the VDS interface 220 receives the service request and then transmits the service request to the subsystem management module 230), and executes a logical process, so as to determine whether the service request is a public operation type or a non-public operation type. The public operation includes title management, operation of deleting equipment object, and operation of supporting asynchronous management, others except for the public operation are non-public operation.

The subsystem management module 230 further defines the plurality of object management modules (242, 244, and 246), and records relationship between the object management modules. The object management modules are invoked by the subsystem management module 230 to execute the service request corresponding to the non-public operation. When determining the service request to be the public operation type, the subsystem management module directly invokes the object management module (242, 244, and 246) corresponding to the service request, and directly transmits the service request to the object management module (242, 244, and 246) for being executed. Moreover, when the service request is the public operation type, the subsystem management module 230 invokes the virtual disk management module 240, and renders the service request to the virtual disk management module 240 for being processed. The virtual disk management module 240 generates a plurality of virtual interfaces for being invoked by the subsystem management module 230 according to a plurality of functions provided by the object management modules (242, 244, and 246), so as to execute the service request of the public operation type. When the service request of the public operation type requires for an operation of supporting asynchronous management (the asynchronous operation is a non-synchronous operation, such as establishment of LUN, deletion of LUN, expansion of LUN, reduction of LUN, recovery of LUN, establishment and deletion of target, establishment and deletion of port, and addition and removal of port), the virtual disk management module 240 further invokes the specific management module 250, and then the asynchronous operations are processed by the asynchronous management module 252 in the specific management module 250. Moreover, if the service request requires for an event notification, a feedback result is generated by the event notification module 254 in the specific management module 250, so as to respond the service request via the VDS interface 220. The virtual disk management module 240 analyzes the object management module (242, 244, and 246) invoked by the service request, and invokes the corresponding object management module (242, 244, and 246) to execute the synchronous operation in the service request. Moreover, if the service request requires for the operation of supporting asynchronous, the virtual disk management module 240 further invokes the specific management module 250 for processing.

Figure 3:
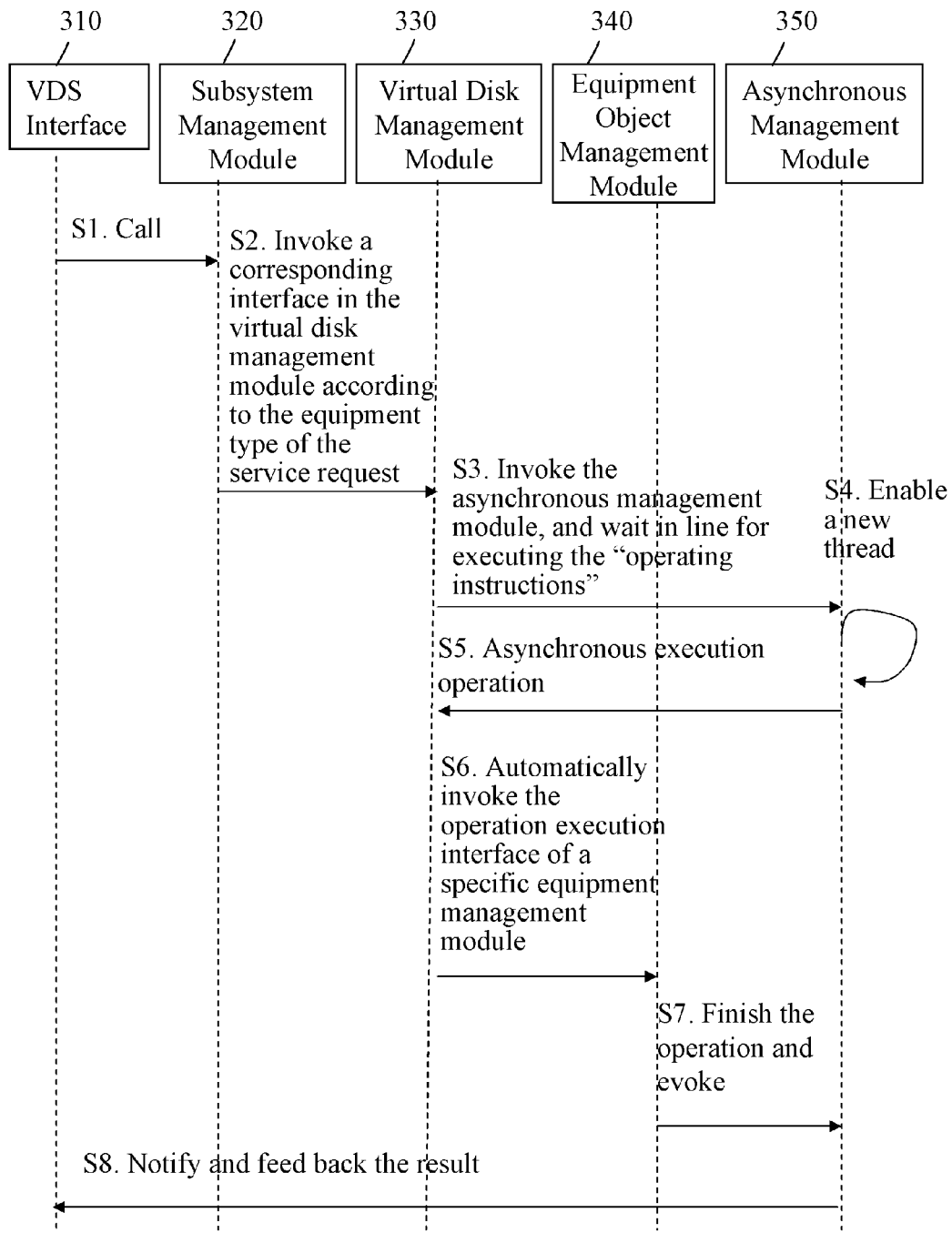
FIG. 3 is a timing diagram of performing an asynchronous operation by the system architecture for implementing a VDS equipment according to the present invention.

The service request of asynchronous operation is taken as an example for illustrating the system architecture for implementing a VDS equipment of the present invention. FIG. 3 is a timing diagram of performing an asynchronous operation by the system architecture for implementing a VDS equipment according to the present invention. Referring to FIG. 3, when a VDS interface 310 receives the service request, a subsystem management module 320 is called (Step S1), and the service request is rendered to the subsystem management module 320 for being processed. The subsystem management module 320 executes the logical process to determine whether the service request is the public operation type or the public operation type. If the service request is the public operation, whether the service request requires for supporting the asynchronous operation or not is determined at the same time. After executing the basic logical process, the subsystem management module 320 determines the service request to be a public operation, and invokes a virtual disk management module 330. The subsystem management module 320 automatically invokes the corresponding interface in the virtual disk management module 330 according to the equipment type of the service request (Step S2). Then the virtual disk management module 330 invokes an asynchronous management module 350, and waits in line for executing the operating instructions (Step S3). When the asynchronous management module 350 receives the request of the asynchronous operation (i.e., the asynchronous management module 350 is invoked by the virtual disk management module 330, and the asynchronous management module 350 processes the asynchronous operation request). The asynchronous management module 350 synchronously processes a plurality of asynchronous operation instructions transmitted by the virtual disk management module 330 in multiple threads (Step S4). Then the asynchronous management module 350 invokes the virtual disk management module 330 (i.e., the asynchronous execution in Step S5), and the virtual disk management module 330 automatically invokes the execution interface of a specific equipment object management module 340, such that the corresponding equipment object management module 340 cooperates to process the asynchronous operation instructions (Step S6). After the operation is finished, the equipment object management module 340 evokes the asynchronous management module 350 (Step S7). The asynchronous management module 350 triggers the event notification module (not shown) to generate the feedback result, and directly transmit the feedback result to the VDS interface 310 (Step S8).

Figure 4:
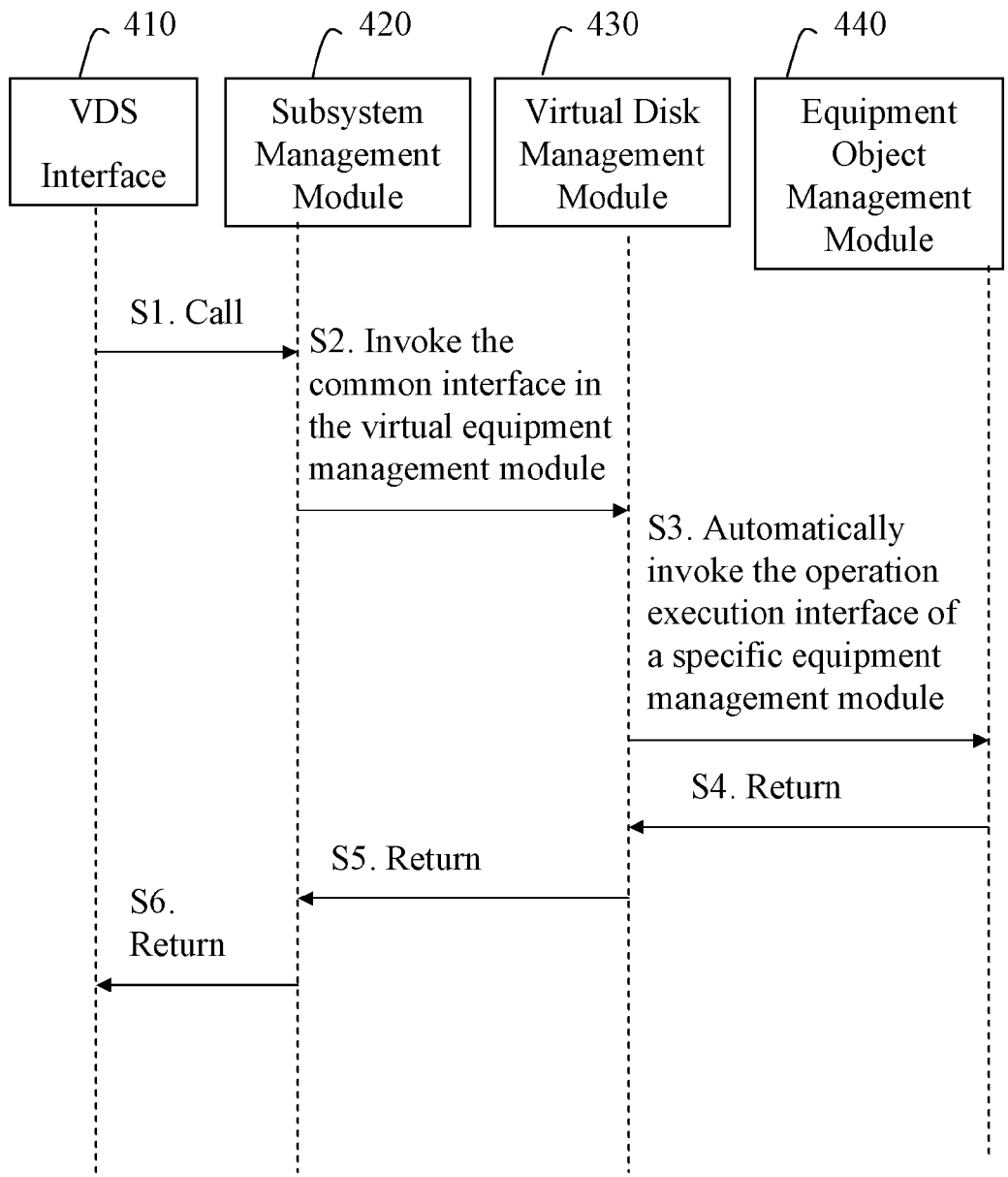
FIG. 4 is a timing diagram of performing a common public operation by the system architecture for implementing a VDS equipment according to the present invention.

Afterwards, FIG. 4 shows a system operation when the service request is the public operation type and the support of asynchronous operation is not required. FIG. 4 is a timing diagram of performing a common public operation by the system architecture for implementing a VDS equipment according to the present invention. Referring to FIG. 4, a VDS interface 410 calls a subsystem management module 420 when receiving the service request (Step S1), and the subsystem management module 420 executes the basic logical process and then determines the service request is a non-public operation. Meanwhile, the subsystem management module 420 directly invokes the common interface in a virtual disk management module 430 (Step S2). The virtual disk management module 430 automatically invokes a corresponding equipment object management module 440 to execute the service request through the operation execution interface of the equipment object management module 440 according to the type of the service request (Step S3). After the execution on the service request is finished, the equipment object management module 440 returns the execution result to the virtual disk management module 430 (Step S4). After that, the virtual disk management module 430 returns the execution result to the subsystem management module 420 (Step S5). The subsystem management module 420 returns the returned result to the VDS interface 430 after receiving the returned result (Step S6).

Figure 5:
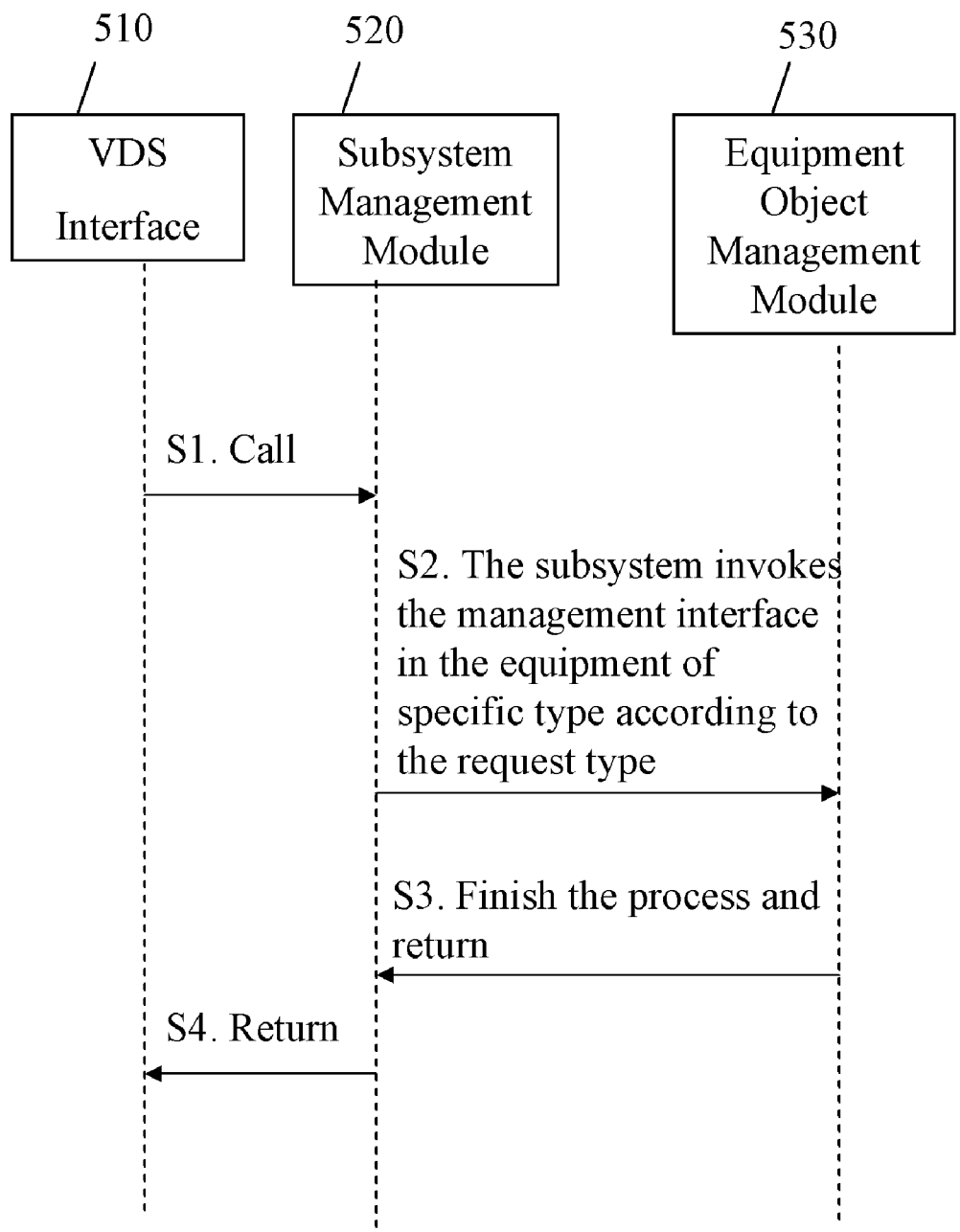
FIG. 5 is a timing diagram of performing a non-public operation by the system architecture for implementing a VDS equipment according to the present invention.

Based on the above, if the service request is a non-public operation, it is unnecessary to invoke the abstracted virtual disk management module. FIG. 5 is a timing diagram of performing a non-public operation by the system architecture for implementing a VDS equipment according to the present invention. Referring to FIG. 5, after receiving the service request, a VDS interface 510 calls a subsystem management module 520 (Step S1). When the subsystem management module 520 determines that the service request is a public operation type, a management interface corresponding to the equipment of specific type is invoked according to the request type, and the service request is rendered to a equipment object management module 530 to be processed (Step S2). After the process on the object management module 530 is finished, an execution result is returned to the subsystem management module 520 (Step S3), and then the subsystem management module 520 returns the processing result to the VDS interface 510.

Base on the above, when the object management module executes the service request (more particularly the asynchronous operation), many executive instructions (or processing actions) having highly similar characteristics are provided. The executive instructions (or processing actions) having highly similar characteristics are abstracted into the virtual disk management module in the present invention, and a specific management module used for processing the asynchronous operation is separated. By means of the abstracting separation method, the repeating implementation on the redundant module may be avoided during the establishment of the system, so as to shorten the time of system establishment (implementation). Moreover, various modules are established (implemented) in different layers in the system according to public operation and non-public operation. Therefore, when the object management module is replaced, the module corresponding to asynchronous operation is not required to be additionally composed and processed, so as to facilitate the overall management on the equipment objects in the VDS system, shorten the time for the maintenance staff to maintain the system, and reduce the overall maintenance complexity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system architecture for implementing a virtual disk service (VDS) equipment, applicable for performing an overall management on multiple service request objects in a VDS system, comprising:

a VDS interface, for receiving a service request of at least one application program;

a subsystem management module, for executing a logical process according to the service request transmitted by the VDS interface, so as to determine whether the service request is a public operation type or a non-public operation type;

a plurality of object management modules, invoked by the subsystem management module, so as to execute the service request corresponding to the non-public operation;

a virtual disk management module, for generating a plurality of virtual interfaces for being invoked by the subsystem management module according to a plurality of functions provided by the object management modules, so as to execute the service request of the public operation type; and a specific management module, invoked by the virtual disk management module, and comprising:

an asynchronous management module, invoked to execute the service request when the service request is the public operation type and requires for an operation of supporting asynchronous management; and an event notification module, for generating a feedback result, and responding the service request via the VDS interface.

2. The system architecture for implementing a VDS equipment according to claim 1, wherein the public operation is one selected from a group consisting of title management, operation of deleting equipment object, and operation of supporting asynchronous management.

3. The system architecture for implementing a VDS equipment according to claim 1, wherein the subsystem management module further records all the object management modules and relationship between the object management modules.

4. The system architecture for implementing a VDS equipment according to claim 1, wherein when the subsystem management module determines that the service request is the non-public operation type, the subsystem management module directly invokes the object management module corresponding to the service request, and transmits the service request to the object management module for being executed.

5. The system architecture for implementing a VDS equipment according to claim 1, wherein the operation of supporting asynchronous management is one selected from a group consisting of establishment of logic unit number (LUN), deletion of LUN, expansion of LUN, reduction of LUN, recovery of LUN, establishment and deletion of target, establishment and deletion of port, and addition and removal of port.

6. The system architecture for implementing a VDS equipment according to claim 1, wherein the asynchronous management module synchronously processes a plurality of asynchronous operation instructions transmitted by the virtual disk management module in multiple threads.

* * * * *